United States Patent
Anandappan et al.

(10) Patent No.: US 9,071,978 B2
(45) Date of Patent: Jun. 30, 2015

(54) SYSTEMS AND METHODS FOR INCORPORATING DETERMINISM IN THE WIRELESS DOMAIN

(71) Applicant: Honeywell International Inc., Morristown, MN (US)

(72) Inventors: Thanga Anandappan, Bangalore (IN); Aloke Roy, Gaithersburg, MD (US)

(73) Assignee: Honeywell International Inc., Morristown, NJ (US)

(*) Notice: Subject to any disclaimer, the term of this patent is extended or adjusted under 35 U.S.C. 154(b) by 363 days.

(21) Appl. No.: 13/764,892

(22) Filed: Feb. 12, 2013

(65) Prior Publication Data

US 2014/0226522 A1    Aug. 14, 2014

(51) Int. Cl.
*H04L 12/28* (2006.01)
*G01R 31/08* (2006.01)
*H04J 3/16* (2006.01)
*H04W 16/18* (2009.01)
*H04L 29/06* (2006.01)
*H04L 12/24* (2006.01)
*H04L 12/801* (2013.01)
*H04L 12/851* (2013.01)
*H04L 12/751* (2013.01)

(52) U.S. Cl.
CPC ......... *H04W 16/18* (2013.01); *H04L 29/06163* (2013.01); *H04L 41/12* (2013.01); *H04L 47/10* (2013.01); *H04L 47/2441* (2013.01); *H04L 45/02* (2013.01)

(58) Field of Classification Search
CPC .... H04L 41/12; H04L 45/02; H04L 29/06163
USPC .................................... 370/254, 466, 230.1
See application file for complete search history.

(56) References Cited

U.S. PATENT DOCUMENTS

| | | | |
|---|---|---|---|
| 8,157,205 B2 | 4/2012 | McWhirk | |
| 8,301,867 B1 | 10/2012 | Mazuk et al. | |
| 2007/0127521 A1* | 6/2007 | Sandell et al. | 370/466 |
| 2009/0141744 A1* | 6/2009 | Poledna et al. | 370/503 |
| 2010/0293292 A1* | 11/2010 | Tamalet et al. | 709/238 |
| 2010/0332715 A1* | 12/2010 | Hadden et al. | 710/310 |
| 2011/0251739 A1* | 10/2011 | Tomas et al. | 701/3 |
| 2012/0008697 A1 | 1/2012 | Emonide et al. | |

* cited by examiner

*Primary Examiner* — Faruk Hamza
*Assistant Examiner* — Abu-Sayeed Haque
(74) *Attorney, Agent, or Firm* — Fogg & Powers LLC (57) ABSTRACT

Systems and methods for incorporating determinism in the wireless domain are provided. In certain embodiments, a network for deterministic wireless communication comprises of a wireless switch and a wireless communication node, wherein the wireless communication node comprises of a processor unit configured to execute executable instructions. The executable instructions direct the processor unit to define avionics full-duplex switched Ethernet (AFDX) parameters for the formation of a virtual link between different end systems and convert the AFDX parameters into one of WiMAX and LTE parameters to define a wireless service flow between the different end systems. The executable instructions also direct the processor unit to create an AFDX schedule for communicating messages between the different end systems based on the AFDX parameters and create a schedule for one of WiMAX and LTE for communicating the messages between the different end systems over a wireless connection based on the AFDX schedule.

18 Claims, 7 Drawing Sheets

| AFDX | WiMAX |
|---|---|
| Single wired link between an end system and switch | Data connections can be associated with a service flow |
| Virtual Link configured between end systems, where every virtual link has its own QOS rule | Service Flow supports packet classification rule. QOS policy can be attached to every classification in service flow |
| Virtual Link QOS Definitions | QOS profile |
| Configured bandwidth to be allocated at defined bandwidth allocation gap | Unsolicited Grant Service (UGS) allocates configured bandwidth and configured intervals |
| Bandwidth | Minimum reserved date rate |
| Bandwidth Allocation Gap | Unsolicited Grant Interval |
| Latency | Maximum Latency |
| Jitter | Tolerated Jitter |

SYSTEMS AND METHODS FOR INCORPORATING DETERMINISM IN THE WIRELESS DOMAIN

BACKGROUND

Systems for enabling avionics communication are frequently subject to stringent standards, where compliance with the standards ensures that messages transmitted from a source end system are received reliably by a destination end system. To provide the desired determinism, avionic communication systems typically depend on the reliability afforded by wired communication. However, the wiring used for communication systems add to the weight of an aircraft. The increase of aircraft weight may negatively impact the financial cost of aircraft operation by decreasing the fuel efficiency of an operating aircraft.

SUMMARY

Systems and methods for incorporating determinism in the wireless domain are provided by this invention. In certain embodiments, a network for deterministic wireless communication comprises of a wireless switch and a wireless communication node, wherein the wireless communication node comprises of a processor unit configured to execute instructions. A set of executable instructions direct the processor unit to define avionics full-duplex switched Ethernet (AFDX) parameters for the formation of a virtual link between different end systems and convert the AFDX parameters into WiMAX parameters to define a wireless service flow between the different end systems. Those executable instructions also direct the processor unit to create an AFDX schedule for communicating messages between the different end systems based on the AFDX parameters and create a WiMAX schedule for communicating the messages between the different end systems over a wireless connection based on the AFDX schedule.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various features illustrated in the figures are not drawn to scale but are drawn to emphasize specific features relevant to the exemplary embodiments.

DETAILED DESCRIPTION

In the following detailed description, reference is made to the accompanying drawings that form a part hereof, and is intended to illustrate a specific embodiment. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure provide systems and methods for incorporating robust determinism in the wireless domain. By providing robust determinism in the wireless domain equivalent to the robust determinism provided by systems that implement Avionics Full-Duplex Switched Ethernet (AFDX), systems, the present disclosure achieves AFDX capabilities using wireless communication links. To achieve the capabilities provided by AFDX, a communication system controls the functionality of either a WiMAX or LTE scheduler so that the scheduler configures service flows that satisfy virtual link definitions defined by an AFDX scheduler. The implementation of robust determinism in a wireless communication link allows wireless avionic communication systems to be installed on airplanes. Because the wireless communication systems use less cabling, aircraft can be lighter and more fuel efficient.

Figure 1:
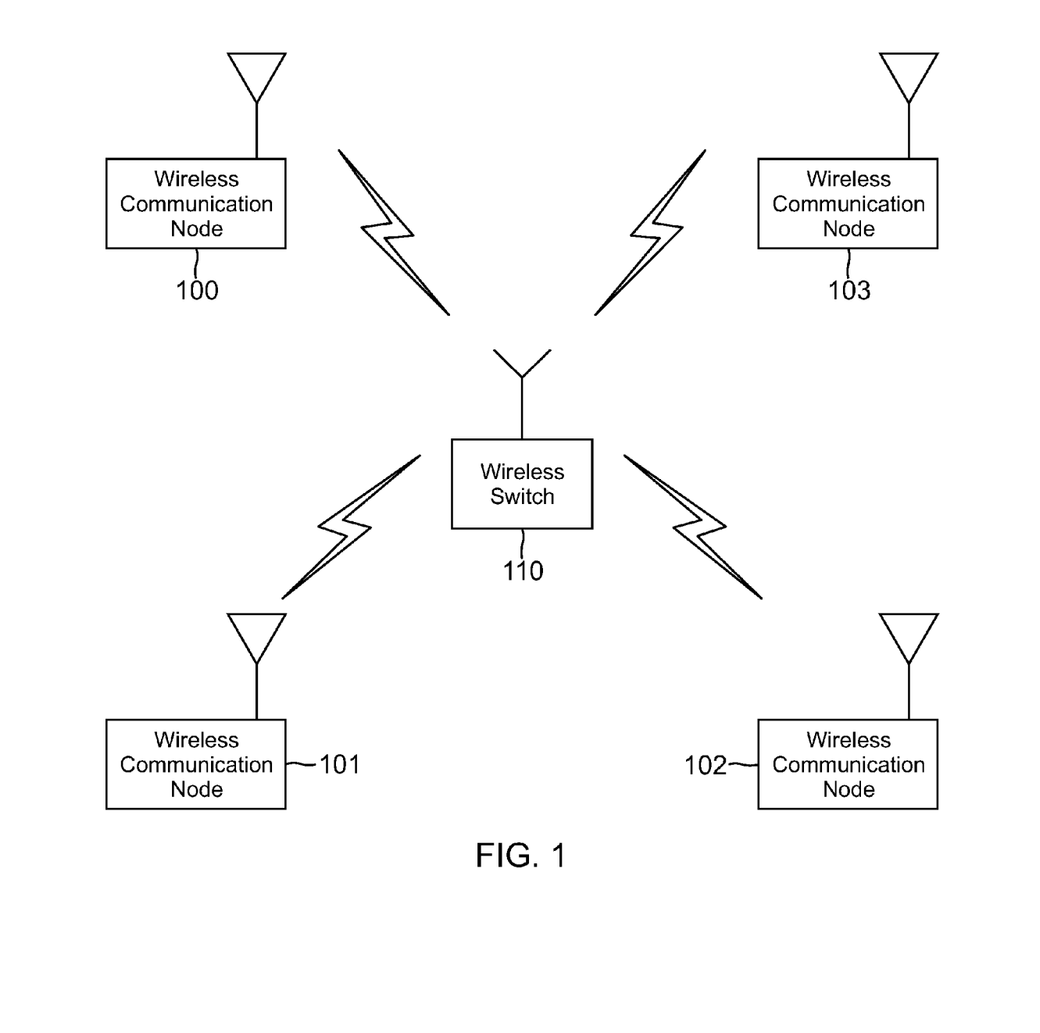
FIG. 1 is a block diagram of a wireless communication network that provides deterministic data communication between end systems in one embodiment described in the present disclosure.

FIG. 1 is a block diagram of a wireless communication network 100, where the network implements the capabilities provided by an AFDX network through a wireless communication medium. The wireless communication network 100 includes a wireless switch 110 and multiple wireless communication nodes 100-103 with a capability to create VLAN connections with dedicated bandwidth and deterministic quality of service (QOS) equivalent to an AFDX network. The wireless communication network 100 accepts AFDX configurations and creates wireless service flows accordingly to achieve AFDX capabilities. For example, the wireless communication network 100 accepts AFDX configurations and creates wireless service flows for communication through either a WiMAX network, or an LTE network. Throughout this application, the wireless network is exemplarily described as a WiMAX network. The use of WiMAX is exemplary and the description also applies to equivalent systems in LTE wireless networks. The wireless switch 110 establishes and maintains wireless connection with wireless communication nodes 100-103 similar to a typical base station. Also, the wireless switch 110 switches the packets between the wireless communication nodes 100-103 depending upon the destination address with a deterministic behavior equivalent to an AFDX switch. For example, when wireless communication node 100 has data for wireless communication node 103, it sends the data to the wireless switch 110 in the timeslot allocated for its data transmission to the wireless switch 110. The wireless switch 110 receives the data from the wireless communication node 100 and forwards the data to the peer wireless communication node 103 in the timeslot allocated for data transmissions from the wireless switch 110 to the wireless communication node 103.

Figure 2:
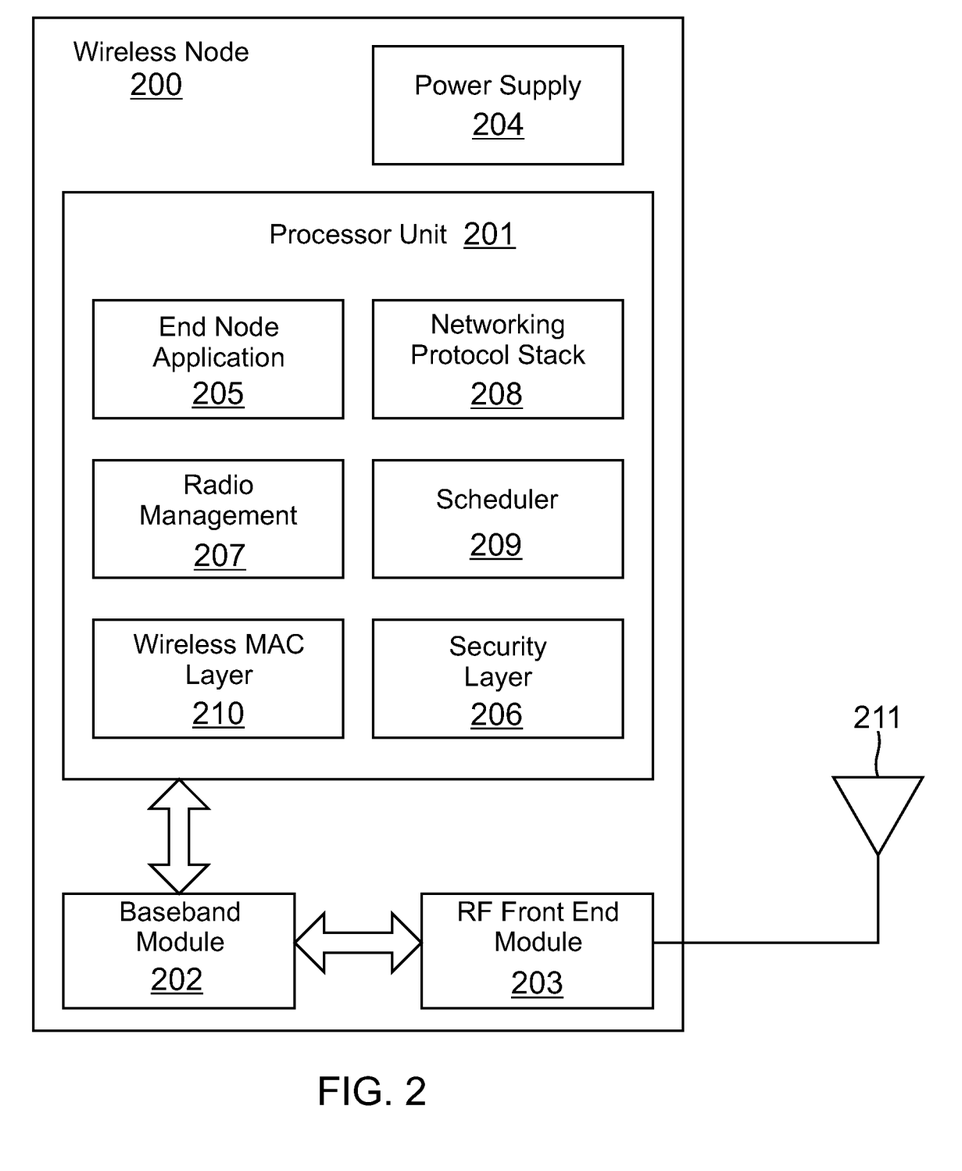
FIG. 2 is a block diagram of a wireless communication node in one embodiment described in the present disclosure.

FIG. 2 is a block diagram of a wireless communication node 200. In certain embodiments, the wireless communication node 200 functions as one of wireless communication nodes 100-103 in FIG. 1. The wireless communication node 200 includes a processor unit 201 that hosts the software for establishing connectivity with a wireless switch to communication with other wireless communication nodes. The processor unit 201 executes software modules that enable the implementation of a network having the capabilities of an AFDX network, where communication is through a wireless medium. The software modules include but are not limited to end node applications 205, networking protocol stacks 208, scheduler 209, wireless MAC layer 210, security layer 206, and radio management 207. The processor unit 201 is mounted on a processor board that interfaces with a baseband module 202, where the baseband module includes the implementation for a wireless physical layer, where the physical layer performs the required modulation/demodulation, encoding/decoding, constellation bit mapping/de-mapping etc. Also, baseband module 202 interfaces with an radio frequency (RF) front end module 203, where the RF front end module 203 is responsible for frequency up/down conversion to/from the operating carrier for transmission or reception of signals received through an antenna 211. The different modules that operate within the wireless communication node 200 may be implemented in multiple hardware boards or on a single hardware board depending upon the requirements of the deployment platform. The hardware for implementation may include any suitable processing device such as a digital signal processor (DSP), central processing unit (CPU), base band chipset, micro-controller, or arithmetic logic unit. Memory 104 may also comprise any suitable storage entity such as a flash drive, magnetic-disk drive, RAM (e.g., DRAM), ROM, PROM, or CD/DVD/Blu-ray, optical storage or optoelectronics circuits. Further, the different components of wireless communication node 200 may be powered through a power supply 204

Figure 3:
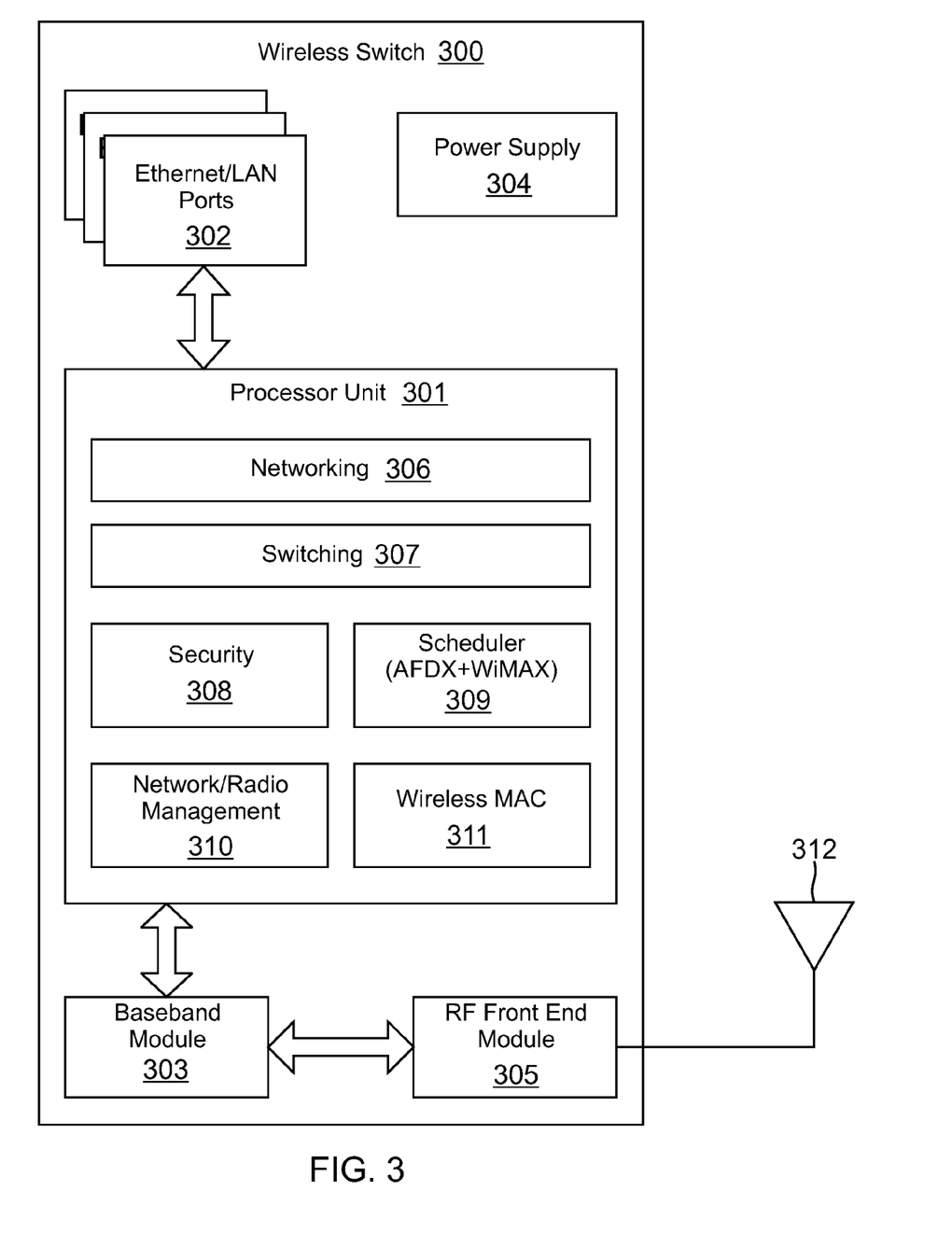
FIG. 3 is a block diagram of a wireless switch in one embodiment described in the present disclosure.

FIG. 3 is a block diagram illustration of a wireless switch 300. The wireless switch 300 may comprise of multiple Ethernet/LAN Ports 302 for communicating with wireless communication nodes (such as wireless communication nodes 100-103 in FIG. 1). The wireless switch 300 includes a processor unit 301 for hosting the software to implement switching module 307, networking module 306, security module 308, network/radio management module 310, wireless MAC module 311, etc. The wireless switch 300 also includes a baseband module 303 that implements the wireless physical layer and an RF front end module 305 that does the frequency translations for the transmission at carrier frequency spectrum over antenna 312. The hardware for the implementation of the components of the wireless switch 300 include suitable processing device such as a digital signal processor (DSP), central processing unit (CPU), micro-controller, chipsets, SOC(system on chip) or arithmetic logic units. Further, certain modules may be stored in computer readable memory, which memory may comprise any suitable storage entity such as a flash drive, magnetic-disk drive, RAM (e.g., DRAM), ROM, PROM, or CD/DVD/Blu-ray, optical storage or optoelectronics circuits and may be implemented in a single board or multiple boards depending upon the deployment platform requirements.

In certain embodiments, the Network/Radio Management module 310 accepts the AFDX configurations for virtual links and their QOS parameters that include link bandwidth, bandwidth allocation gap (BAG), latency, jitter, and the like, from a user and pass them to the scheduler module 309. The scheduler module 309 is responsible for translating the AFDX link parameters into wireless connections parameters (such as WiMAX or LTE connection parameters) and allocating timeslots and other resources needed for the transmission and reception of packets in the wireless medium in compliance with AFDX deterministic requirements. The scheduler module 309 derives WiMAX configurations like number of service flows, service types, reserved bandwidth, allocation interval, tolerated latency, jitter, and the like based on the AFDX virtual link definitions.

Further, the scheduler module 309 creates an uplink/downlink map based on the WiMAX QOS parameters translated from AFDX definitions. The uplink/downlink map contains combinations of timeslots, subcarrier allocations, and other control information needed for the downlink and uplink transmission and reception. When the uplink/downlink map is determined, the MAC module 311 broadcasts the uplink/downlink maps to the end systems associated with the network.

In at least one embodiment, the AFDX links are mapped to unsolicited grant service (UGS) as UGS is a non-contention based service supported by WiMAX. Further, UGS allows transmissions to be scheduled similarly to AFDX. For example, UGS allows transmissions to be scheduled with a fixed bandwidth and allocation interval. By defining the WiMAX parameters based on defined AFDX parameters, communications through WiMAX service flows are able to deterministically ensure that messages transmitted from a source end system are received by a destination end system, while satisfying the AFDX parameters. When the wireless communications are performed in an LTE system, the AFDX links are mapped to LTE guaranteed bit rate (GBR) service.

Figure 4:
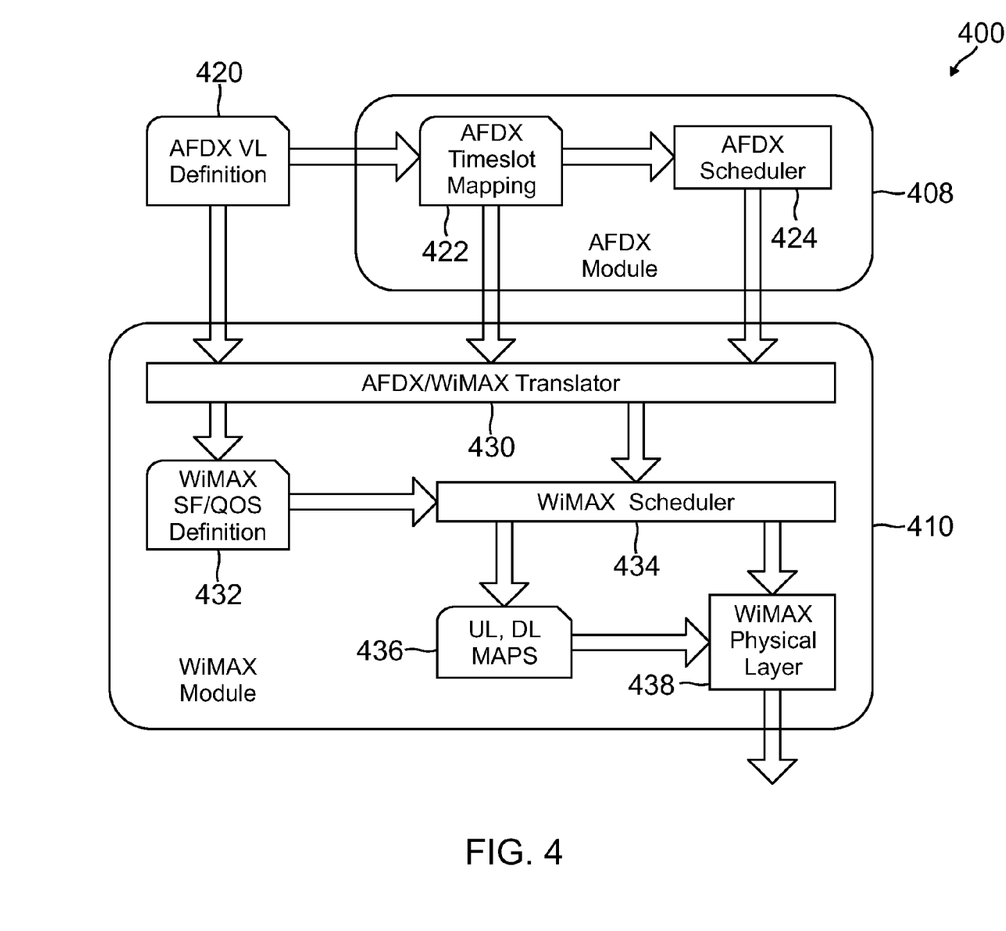
FIG. 4 is a block diagram illustrating the interaction between an AFDX module and a WiMAX module in one embodiment described in the present disclosure.

FIG. 4 is a block diagram illustrating the functionality of translating AFDX link definitions into WiMAX service flow configurations in detail. Further, in certain implementations, a WiMAX module 410 functions as the media access control (MAC) layer. Similarly, AFDX module 408, when executed by a processing unit like processing unit 201 or 301, functions, in certain embodiments, as an AFDX scheduler module (such as scheduler modules 209 or 309). As illustrated in FIG. 4, the WiMAX module 410 and the AFDX module 408 function together to provide wireless communication that has the robust determinism afforded by communication solely under the AFDX standard. Due to the determinism afforded by the arrangement of the AFDX module 408 and the WiMAX module 410, the system can be implemented in safety critical systems like airplanes, where determinism is required. Of particular benefit on airplanes is the reduction in weight offered by wireless communication, which weight reduction can increase fuel efficiency.

As illustrated, both the AFDX module 408 and the WiMAX module 410 receive an AFDX virtual link (VL) definition 420. The AFDX VL definition 420 defines parameters that are used to configure a link between two different end systems in an AFDX communication link. Both the AFDX module 408 and the WiMAX module 410 use the AFDX VL definition 420 to configure communication parameters. For example, the WiMAX module 410 includes an AFDX/WiMAX translator 430 that translates parameters and transmission data defined according to the AFDX standard for use by the WiMAX module 410. Also, in other embodiments, the AFDX/WiMAX translator 430 also translates parameters and transmission data associated with the WiMAX standard for use by the AFDX module 408. For example, the AFDX/WiMAX translator 430 receives the AFDX VL definition 420 and translates it for use by the WiMAX service flow (SF)/quality of service (QOS) definition 432, which WiMAX SF/QOS definition 432 defines parameters for a WiMAX communication link.

Figure 5:
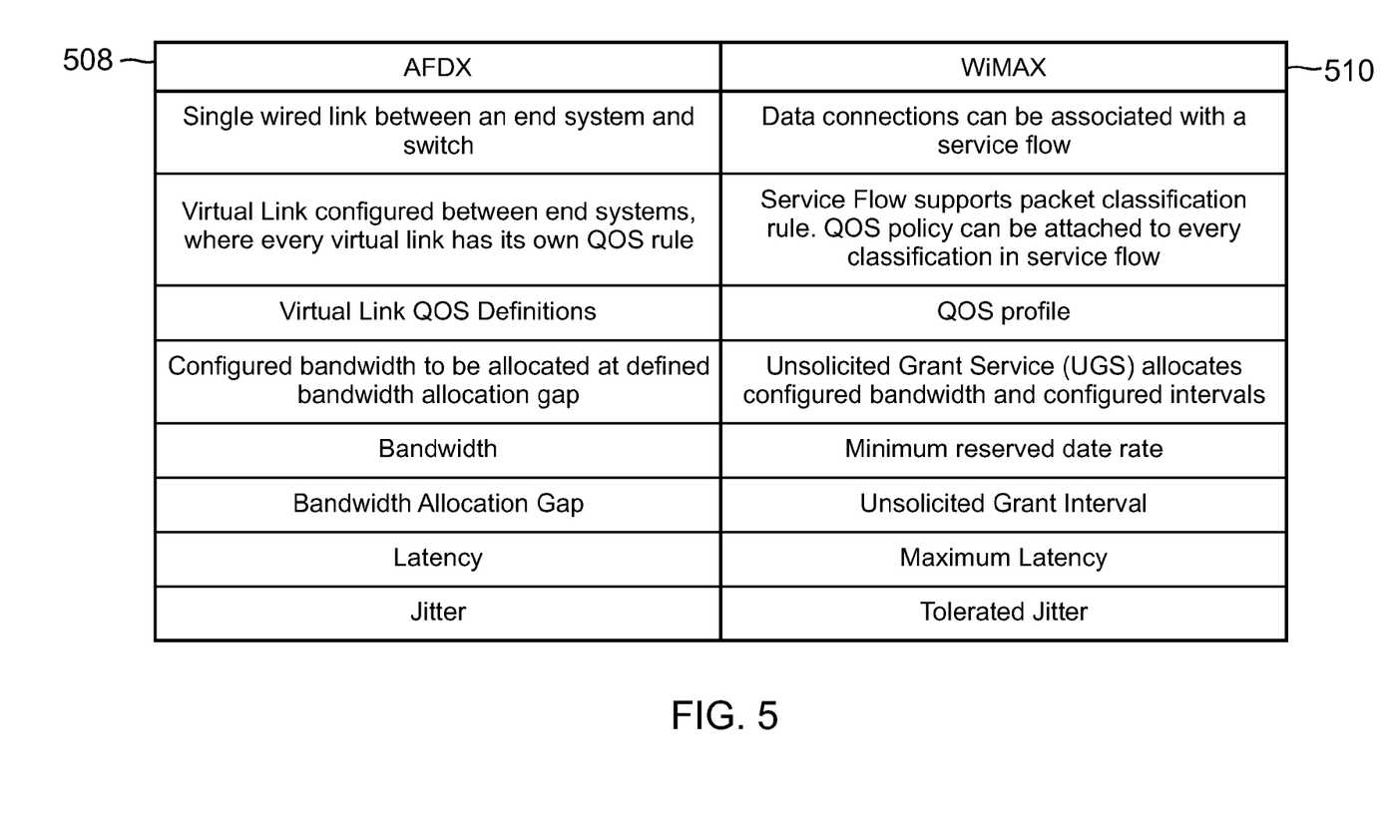
FIG. 5 is a table illustrating the association between AFDX and WiMAX properties and parameters in one embodiment described in the present disclosure.

FIG. 5 is a table that illustrates different AFDX properties 508 and their associated WiMAX properties 510, where the different properties describe characteristics of communications using the respective link. As illustrated in FIG. 5, AFDX utilizes a single wired link between an end system and a switch, whereas the WiMAX equivalent would be a data connection that is associated with a service flow. Further, in AFDX, for each virtual link configured between end systems, every virtual link will have an associated quality of service (QOS) rule. Similarly, in WiMAX, where a service flow supports a packet classification rule, a separate QOS policy can be attached to every classification in a service flow. Also, the virtual link QOS definitions for AFDX can be used to define a QOS profile in WiMAX. In at least one embodiment, the AFDX module 408 configures the bandwidth to be allocated at defined bandwidth allocation gaps and the WiMAX module 410 uses the defined bandwidth allocation gap to configure bandwidth and intervals in a UGS WiMAX application, where the WiMAX allocations are not negotiable during runtime.

As part of using the defined bandwidth allocation gaps to configure bandwidth and intervals in a UGS WiMAX application, the AFDX/WiMAX translator 430 translates parameters in the AFDX VL definition 420 into parameters for use by the WiMAX SF/QOS definition 432. As shown in FIG. 5, the AFDX VL definition can define parameters that include bandwidth, bandwidth allocation gap, latency, and jitter. The AFDX/WiMAX translator 430 translates these parameters into associated WiMAX parameters. For example, the AFDX/WiMAX translator 430 translates the AFDX bandwidth parameter into a minimum reserved data rate, the bandwidth allocation gap into an unsolicited grant interval, the latency into a maximum latency, and the jitter into a tolerated jitter. In certain embodiments, when calculating the maximum latency for the WiMAX SF/QOS definition, the WiMAX module 410 includes the latency provided by the AFDX VL definition 420 and adds the latency associated with communication through the WiMAX communication link.

When the AFDX VL Definition 420 is defined and translated into the WiMAX SF/QOS definition 432 by the AFDX/WiMAX translator 430, the AFDX module 408 uses the AFDX VL definition 420 to configure when to transmit data packets. For example, the AFDX module 408 creates an AFDX timeslot mapping 422 that is used by an AFDX scheduler 424. When creating the AFDX timeslot mapping 422, the AFDX module 408 uses the AFDX VL definition 420 to identify and configure the AFDX timeslot mapping 422 for the transmission of data packets. When the AFDX module 408 has created the AFDX timeslot mapping 422 for data packets associated with a particular virtual link, the AFDX/WiMAX translator 430 in the WiMAX module 410 translates the time slot mapping for use by a WiMAX scheduler 434 in the creation of uplink/downlink maps 436 that contain combinations of timeslots and subcarrier allocations. To create the uplink/downlink maps 436, the WiMAX scheduler uses the WiMAX SF/QOS definition 432 in conjunction with the translated timeslot mapping. When the uplink/downlink maps 436 are created, the uplink/downlink maps are broadcasted to end systems in the WiMAX network.

In the creation of the uplink/downlink maps, the WiMAX scheduler 434 makes the uplink/downlink maps 436 constant such that the uplink/downlink maps 436 are not dynamically changeable to support the static AFDX configurations. The static creation of the uplink and downlink maps can improve jitter to match AFDX requirements, where the maximum tolerated jitter is configured in the MAC layer of a WiMAX communication system. For example, the WiMAX SF/QOS definition includes a maximum tolerated jitter that is defined based on the jitter parameters in the AFDX VL definition. In certain implementations, when the WiMAX module 410 is only providing support for UGS applications, the WiMAX module 410 does not necessarily support the entire MAC layer services and features associated with general WiMAX applications. For example, in the convergence sub-layer of the MAC layer, the WiMAX may solely support Ethernet communications. Further, there are multiple WiMAX capabilities that are not used in UGS and, thus, may not be required by the operation of the WiMAX module 410. For example, capabilities like dynamic service change, dynamic service deletion, dynamic burst profile change, TFTP/secondary management, mobility/handover support, NSP advertisements and the like may not be required in the operation of the WiMAX module 410. Further in the security sub-layer of the MAC layer, the security is based either on public key management (PKM) V1 or V2 and the authentication at the base station is RSA based; AAA based authentication may not be required. The reduced features in the MAC layer implemented by WiMAX module 410 limit the operation of the communication nodes to prevent dynamic negotiations within the MAC layer.

In a further embodiment, when the time slot mapping 422 is identified by the AFDX module 410, the AFDX scheduler 424 transmits data packets according to the time slot allocations found in the AFDX timeslot mapping 422. The AFDX scheduler 424 sends the data packets to the WiMAX MAC layer, which formats the data for transmission over a wireless communication link implementing WiMAX. The WiMAX scheduler 434, which transmits the data packets according to the uplink/downlink slot allocations found in the uplink/downlink maps 436. The data is then transmitted out of the communication node through the WiMAX physical layer 438 to other end systems.

In at least one embodiment, when a communication node is receiving data, the WiMAX module 410 receives and provides the data for handling by the AFDX module 408. Thus, a communication node 400 receives and transmits data through the WiMAX module 410 and the AFDX module 408 configures the WiMAX module 410 to ensure that the communication is deterministic.

Figure 6:
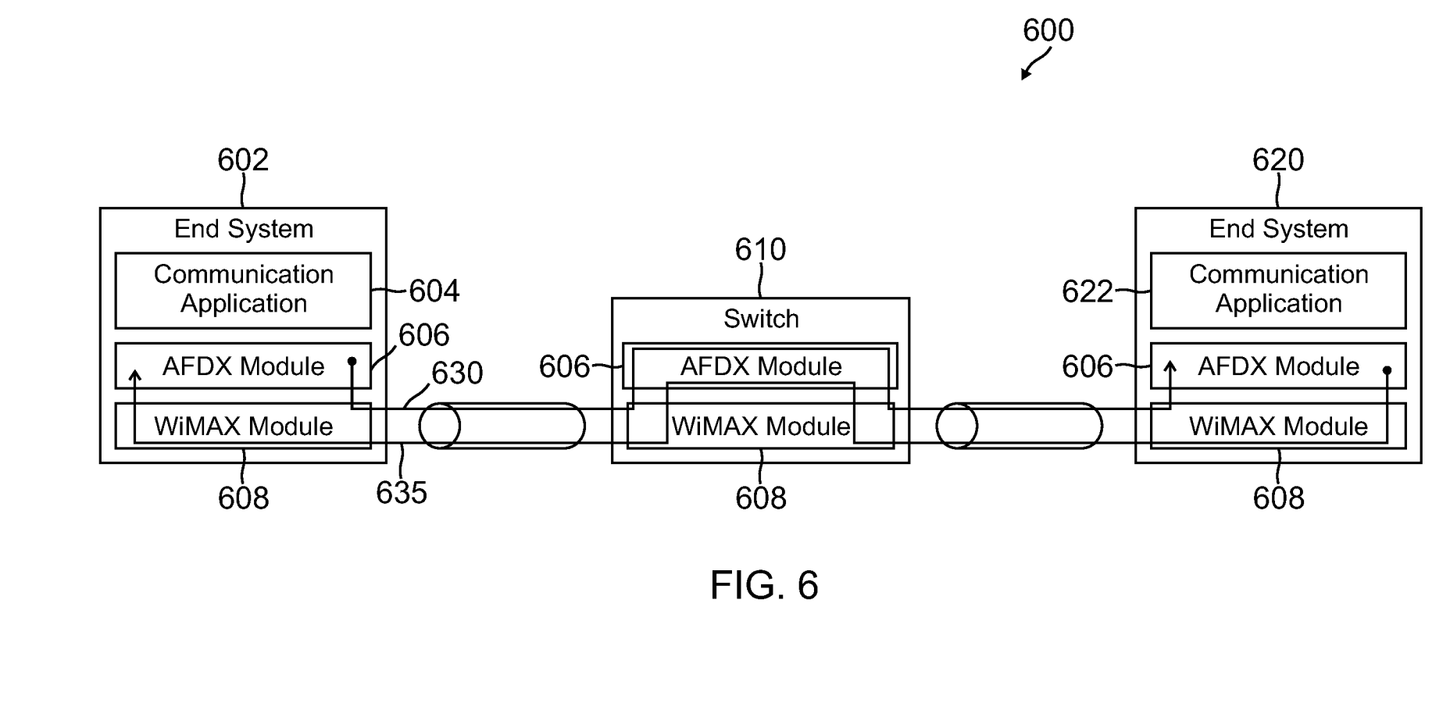
FIG. 6 is a block diagram illustrating communication between separate end systems in one embodiment described in the present disclosure.

FIG. 6 is a diagram to illustrate the message flow in a network 600 comprising of multiple end systems communicating with one another through a communication node as described above in relation to FIGS. 1-3. Network 600 includes a first end system 602, a switch 610, and a second end system 620. As illustrated, the first end system 602 and the second end system 620 communicate directly with switch 610 but indirectly with one another through the switch 610. In alternative implementations, the first end system 602 and the second end system 620 communicate directly with one another over a wireless communication link. In other alternative embodiments, the first end system is able to transmit data to multiple end systems through switch 610.

In certain implementations, both the first end system 602, the switch 610, and the second end system 620 include an AFDX module 606 and a WiMAX module 608. Further, the first end system 602 executes a first communication application 604 that communicates with a second communication application 622 that executes on the second end system 620. The first communication application 604 creates a data message for transmission to the second communication application 622. The first communication application 604 provides the data to the AFDX module 606, which prepares the message for transmission over a first virtual link 630 according to the AFDX standard. The AFDX module 606 functions similarly to AFDX module 408 and the AFDX module 606 provides AFDX communication parameters and the data to the WiMAX module 608 as described above in relation to FIGS. 1 to 4.

In at least one embodiment, the WiMAX module 608 translates the AFDX communication parameters into WiMAX communication parameters and then transmits the message to the switch 610 over the first virtual link 630. The switch receives the data through the WiMAX module 608, which translates the received data from WiMAX parameters into AFDX parameters and provides the data to the AFDX module 606. The AFDX module 606 then provides the data to the switch 610, which identifies the destination end system for the data and then provides the data to the AFDX module 606 on switch 610 with the appropriate AFDX parameters to complete transmission of the data to the second end system 620. The AFDX module 606 on switch 610 then provides the data to the WiMAX module 608, where the WiMAX module 608 prepares and transmits the data over a wireless communication link to the second end system 620. The second end system 620 receives the data through the WiMAX module 608 on the second end system 620, which translates the received data from WiMAX parameters into AFDX parameters and provides the data to the AFDX module 606. The AFDX module 606 then provides the data to the second communication application 622 for further processing. In a similar manner the second end system 620 can communicate data with the first end system 602 over a second virtual link 635. By using both the AFDX module 606 and the WiMAX module 608, different end systems can communicate with one other over wireless communication links with the determinism afforded by the AFDX communication standard.

Figure 7:
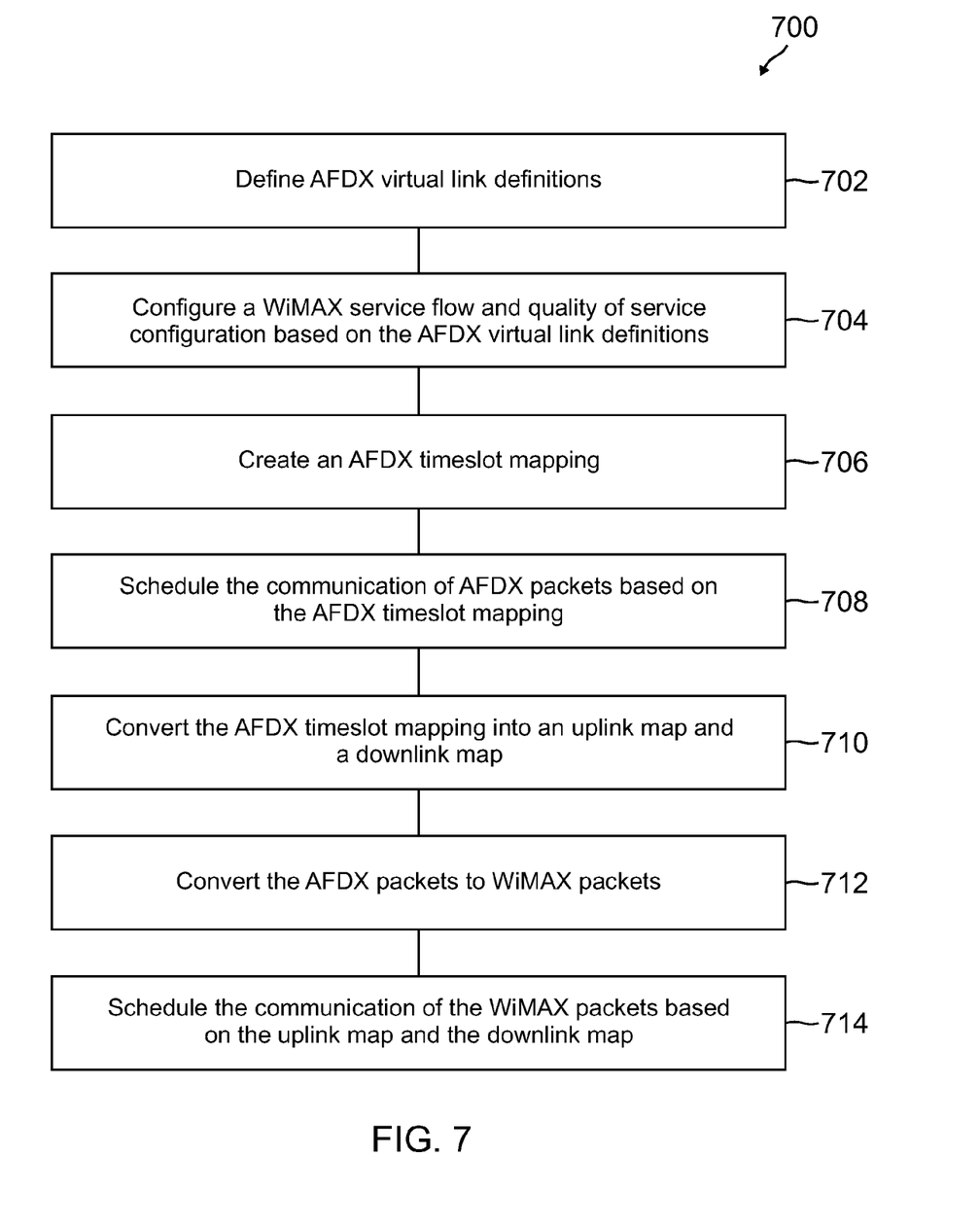
FIG. 7 is a flow diagram illustrating a method for incorporating robust determinism in the wireless domain.

FIG. 7 is a flow diagram of a method 700 that incorporates the determinism offered by AFDX in WiMAX communications. The method 700 proceeds at 702, where AFDX virtual link definitions are defined. For example, an AFDX module defines values such as the number of virtual links, source and destination end systems, bandwidth, bandwidth allocation gap, latency, jitter, and the like. When the AFDX virtual link definitions are defined, the method 700 proceeds at 704 where a WiMAX service flow and quality of service configuration is configured based on the AFDX virtual link definitions. For example, a WiMAX module may define the minimum reserved data rate, the unsolicited grant interval, the maximum latency, and the tolerated jitter based on AFDX virtual link definitions like bandwidth, bandwidth allocation gap, latency, and jitter.

In at least one implementation, the method 700 proceeds to 706, where an AFDX timeslot mapping is created. For example, the AFDX module creates the AFDX timeslot mapping based on the AFDX virtual link definitions. When the timeslot mapping is created, the method 700 proceeds to 708, where the communication of AFDX packets is scheduled based on the AFDX timeslot mapping. The method then proceeds to 710, where the AFDX timeslot mapping is converted into an uplink map and downlink map. In certain implementations, when the AFDX timeslot mapping is converted into the uplink and downlink maps, the WiMAX module broadcasts the uplink and downlink maps with the different end systems in a wireless communication network. The method then proceeds to 712, where the AFDX packets are converted to WiMAX packets. For example, AFDX packets are encapsulated by a WiMAX MAC header to form a WiMAX PDU for transmission over a wireless link. The method then proceeds to 714 where the communication of the WiMAX packets is scheduled based on the uplink map and the downlink map.

EXAMPLE EMBODIMENTS

Example 1 includes a network for deterministic wireless communication, the network comprising: a wireless switch; and a wireless communication node, wherein the wireless communication node comprises a processor unit configured to execute executable instructions, wherein the executable instructions direct the processor unit to: define avionics full-duplex switched Ethernet (AFDX) parameters for the formation of a virtual link between different end systems; convert the AFDX parameters into one of WiMAX and LTE parameters to define a wireless service flow between the different end systems; create an AFDX schedule for communicating messages between the different end systems based on the AFDX parameters; and create a schedule for one of WiMAX and LTE for communicating the messages between the different end systems over a wireless connection based on the AFDX schedule.

Example 2 includes the network of Example 1, wherein the wireless switch comprises: a base band module configured to implement a wireless physical layer; a radio frequency front end module configured to control up and down conversion of signals to a carrier frequency for transmission or reception through an antenna; and a switch processor unit configured to: define switch AFDX parameters for the formation of a virtual link between different end systems; convert the switch AFDX parameters into the one of WiMAX and lte switch parameters to define a wireless service flow between the network switch and an end system; create a switch AFDX schedule for communicating messages between the network switch and the end system based on the switch AFDX parameters; and create a schedule for communicating the messages between the network switch and the end system over a wireless connection based on the AFDX schedule.

Example 3 includes the network of any of Examples 1-2, wherein the wireless communication node further comprises: a base band module configured to implement a wireless physical layer; and a radio frequency front end module configured to control up and down conversion of signals to a carrier frequency for transmission or reception through an antenna.

Example 4 includes the network of any of Examples 1-3, further comprising a network management unit configured to accept AFDX parameters from a user.

Example 5 includes the network of any of Examples 1-4, wherein the creation of the AFDX schedule by the processor unit comprises: defining an afdx timeslot mapping based on the AFDX parameters; and scheduling the communication of the messages based on the timeslot mapping.

Example 6 includes the network of any of Examples 1-5, wherein the one of WiMAX and LTE parameters based on the AFDX parameters enable one of WiMAX unsolicited grant service and LTE guaranteed bit rate service.

Example 7 includes the network of any of Examples 1-6, wherein creating the one of WiMAX and LTE schedule based on the AFDX schedule comprises: creating an uplink map and a downlink map based on an AFDX timeslot mapping and the one of WiMAX and LTE parameters; scheduling communication of the message based on an AFDX communication parameters.

Example 8 includes the network of any of Examples 1-7, wherein the wireless switch and the wireless communication node operate in an aircraft communication environment Example 9 includes the network of any of Examples 1-8, wherein the processing unit is located on a switch between the different end systems, wherein the processing unit routes messages between a first end system and a second end system.

Example 10 includes a method for providing deterministic wireless communication, the method comprising: defining AFDX virtual link definitions; configuring a WiMAX service flow and quality of service configuration based on the AFDX virtual link definitions; creating an AFDX timeslot mapping; scheduling the communication of AFDX packets based on the AFDX timeslot mapping; converting the AFDX timeslot mapping into an uplink map and a downlink map; converting the AFDX packets to WiMAX packets; and scheduling the communication of the WiMAX packets based on the uplink map and the downlink map.

Example 11 includes the method of Example 10, wherein scheduling the communication of the WiMAX packets comprises creating static uplink and downlink maps from the AFDX virtual link definitions.

Example 12 includes the method of any of Examples 10-11, wherein defining the AFDX virtual link comprises: defining a virtual link bandwidth; defining a bandwidth allocation gap for the virtual link; defining a virtual link latency; and defining a virtual link jitter.

Example 13 includes the method of Example 12, wherein configuring the WiMAX service flow and quality of service configuration based on the AFDX virtual link definitions comprises: converting the virtual link bandwidth into a minimum reserved data rate; converting the bandwidth allocation gap into an unsolicited grant interval; converting the virtual link latency into a maximum latency; and converting the jitter into a tolerated jitter.

Example 14 includes the method of any of Examples 12-13, wherein the maximum latency is calculated by adding the WiMAX latency to the virtual link latency.

Example 15 includes the method of any of Examples 10-14, further comprising broadcasting the uplink and downlink map to different end systems.

Example 16 includes the method of any of Examples 10-15, wherein the WiMAX parameters based on the AFDX parameters enable WiMAX unsolicited grant service.

Example 17 includes the method of any of Examples 10-16, wherein the processing unit attaches a quality of service policy to each classification in the wireless service flow.

Example 18 includes a system for deterministic wireless communication, the system comprising: a memory unit configured to store executable instructions; and a processing unit configured to execute the executable instructions, wherein the executable instructions comprise: an avionics full-duplex switched Ethernet (AFDX) module, the AFDX module configured to define, upon execution, AFDX parameters for communication between separate end systems; and one of a WiMAX and LTE module configured to translate, upon execution, the AFDX parameters into one of WiMAX and LTE parameters and to control wireless communications between the separate end systems.

Example 19 includes the system of Example 18, wherein the AFDX module is configured to: define AFDX parameters for a virtual link; define a timeslot mapping for communication of AFDX parameters with the separate end systems; and create an AFDX schedule for communicating messages between the separate end systems based on the AFDX parameters and the timeslot mapping.

Example 20 includes the system of Example 19, wherein the one of WiMAX and LTE module is configured to: convert the AFDX parameters into the one of WiMAX and LTE parameters to define a wireless service flow between the different end systems; and create one of a WiMAX and LTE schedule for communicating the messages between the different end systems over a wireless connection based on the AFDX schedule.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A network for deterministic wireless communication, the network comprising:
   a wireless switch; and
   a wireless communication node, wherein the wireless communication node comprises a processor configured to execute executable instructions, wherein the executable instructions direct the processor to:
      define avionics full-duplex switched Ethernet (AFDX) parameters for the formation of a virtual link between different end systems;
      convert the AFDX parameters into one of WiMAX and LTE parameters to define a wireless service flow between the different end systems;
      create an AFDX schedule for communicating messages between the different end systems based on the AFDX parameters; and
      create a schedule for one of WiMAX and LTE for communicating the messages between the different end systems over a wireless connection based on the AFDX schedule.

2. The network of claim 1, wherein the wireless switch comprises:
   a base band device configured to implement a wireless physical layer;
   a radio frequency front end device configured to control up and down conversion of signals to a carrier frequency for transmission or reception through an antenna; and
   a switch processor configured to:
      define switch AFDX parameters for the formation of a virtual link between different end systems;
      convert the switch AFDX parameters into the one of WiMAX and LTE switch parameters to define a wireless service flow between the network switch and an end system;
      create a switch AFDX schedule for communicating messages between the network switch and the end system based on the switch AFDX parameters; and
      create a schedule for communicating the messages between the network switch and the end system over a wireless connection based on the AFDX schedule.

3. The network of claim 1, wherein the wireless communication node further comprises:
   a base band device configured to implement a wireless physical layer; and
   a radio frequency front end device configured to control up and down conversion of signals to a carrier frequency for transmission or reception through an antenna.

4. The network of claim 1, further comprising a network management device configured to accept AFDX parameters from a user.

5. The network of claim 1, wherein the creation of the AFDX schedule by the processor comprises:
   defining an AFDX timeslot mapping based on the AFDX parameters; and
   scheduling the communication of the messages based on the timeslot mapping.

6. The network of claim 1, wherein the one of WiMAX and LTE parameters based on the AFDX parameters enable one of WiMAX unsolicited grant service and LTE guaranteed bit rate service.

7. The network of claim 1, wherein creating the one of WiMAX and LTE schedule based on the AFDX schedule comprises:
creating an uplink map and a downlink map based on an AFDX timeslot mapping and the one of WiMAX and LTE parameters;
scheduling communication of the message based on an AFDX communication parameters.

8. The network of claim 1, wherein the wireless switch and the wireless communication node operate in an aircraft communication environment.

9. The network of claim 1, wherein the processor is located on a switch between the different end systems, wherein the processor routes messages between a first end system and a second end system.

10. A method for providing deterministic wireless communication, the method comprising:
defining AFDX virtual link definitions;
configuring a WiMAX service flow and quality of service configuration based on the AFDX virtual link definitions;
creating an AFDX timeslot mapping;
scheduling the communication of AFDX packets based on the AFDX timeslot mapping;
converting the AFDX timeslot mapping into an uplink map and a downlink map;
converting the AFDX packets to WiMAX packets; and
scheduling the communication of the WiMAX packets based on the uplink map and the downlink map.

11. The method of claim 10, wherein scheduling the communication of the WiMAX packets comprises creating static uplink and downlink maps from the AFDX virtual link definitions.

12. The method of claim 10, wherein defining the AFDX virtual link comprises:
defining a virtual link bandwidth;
defining a bandwidth allocation gap for the virtual link;
defining a virtual link latency; and
defining a virtual link jitter.

13. The method of claim 12, wherein configuring the WiMAX service flow and quality of service configuration based on the AFDX virtual link definitions comprises:
converting the virtual link bandwidth into a minimum reserved data rate;
converting the bandwidth allocation gap into an unsolicited grant interval;
converting the virtual link latency into a maximum latency; and
converting the jitter into a tolerated jitter.

14. The method of claim 12, wherein the maximum latency is calculated by adding the WiMAX latency to the virtual link latency.

15. The method of claim 10, further comprising broadcasting the uplink and downlink map to different end systems.

16. The method of claim 10, wherein the WiMAX parameters based on the AFDX parameters enable WiMAX unsolicited grant service.

17. The method of claim 10, wherein a processor attaches a quality of service policy to each classification in the wireless service flow.

18. A system for deterministic wireless communication, the system comprising:
a memory configured to store executable instructions; and
a processor configured to execute the executable instructions, wherein the executable instructions comprise:
an avionics full-duplex switched Ethernet (AFDX) device, the AFDX device configured to define, upon execution, AFDX parameters for communication between separate end systems; and
one of a WiMAX and LTE device configured to translate, upon execution, the AFDX parameters into one of WiMAX and LTE parameters and to control wireless communications between the separate end systems, wherein the AFDX device is configured to:
define AFDX parameters for a virtual link;
define a timeslot mapping for communication of AFDX parameters with the separate end systems; and
create an AFDX schedule for communicating messages between the separate end systems based on the AFDX parameters and the timeslot mapping, wherein the one of WiMAX and LTE device is configured to:
convert the AFDX parameters into the one of WiMAX and LTE parameters to define a wireless service flow between the different end systems; and
create one of a WiMAX and LTE schedule for communicating the messages between the different end systems over a wireless connection based on the AFDX schedule.

* * * * *